United States Patent Office 3,160,642
Patented Dec. 8, 1964

3,160,642
6α,16β-DIMETHYL-Δ^{1,4}-PREGNADIENE-17α-OL-3,20-DIONE AND ESTERS THEREOF
Carl Djerassi, Mexico City, Mexico, assignor, by mesne assignments, to Syntex Corporation, a corporation of Panama
No Drawing. Filed Mar. 3, 1959, Ser. No. 796,764
Claims priority, application Mexico Oct. 3, 1958
3 Claims. (Cl. 260—397.4)

The present invention relates to novel cyclopentanophenanthrene derivatives and to a method for the preparation thereof.

More particularly, it relates to the new 6α,16β-dimethyl-17α-hydroxyprogesterone, to its 1-dehydro derivatives and to the esters of such compounds, represented by the following formula:

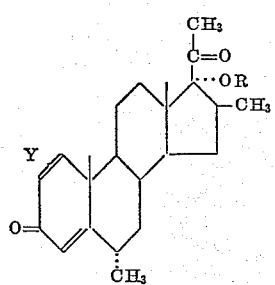

wherein Y represents a double bond at C–1(2) or a saturated linkage at C–1(2), and R means a hydrogen atom or an acyl group derived from a hydrocarbon carboxylic acid of up to 12 carbon atoms, saturated or unsaturated, of straight or branched chain, mixed straight (branched)-cyclic, substituted or not with functional groups such as hydroxyl, acyloxy, methoxy, chlorine or bromine; typical such esters are the acetates, propionates, t-butyrates, hemisuccinates, enanthates, caproates, benzoates, trimethylacetates, phenoxyacetates, phenylpropionates, cyclopentylpropionates and β-chloropropionates. Such compounds are potent progestational hormones and, furthermore, are intermediates for the preparation of 6α,16β-dimethyl cortical hormones, since an oxygen function can be introduced at position C–11, for example a β-hydroxyl group, by incubation with bovine suprarrenal glands. There can also be introduced a hydroxyl group at C–21 by known chemical and microbiological methods. One of the intermediates in the synthesis, namely 6β,16β-dimethyl-allopregnan-17α-ol-3,20-dione, can also be employed as an intermediate for the preparation of 6,16β-dimethyl cortical hormones.

The novel method of the present invention is illustrated by the following equation:

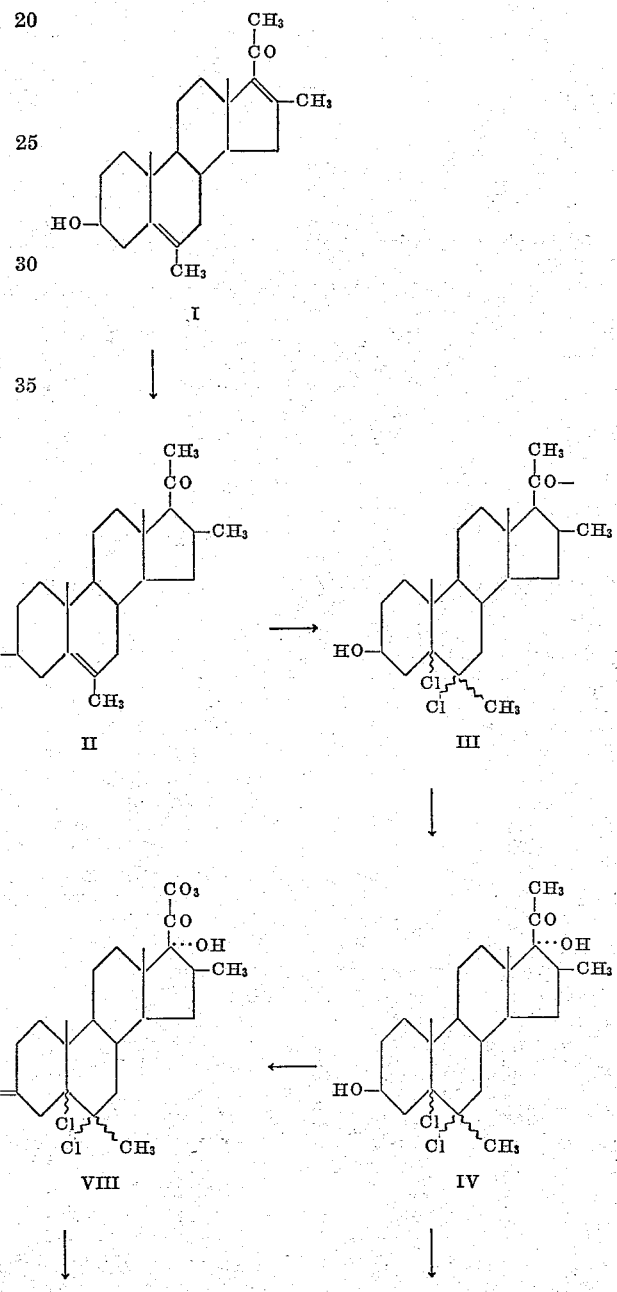

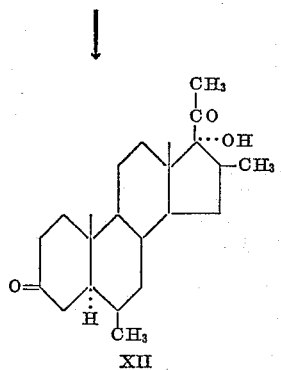

XII

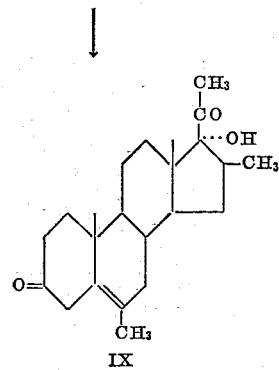

IX

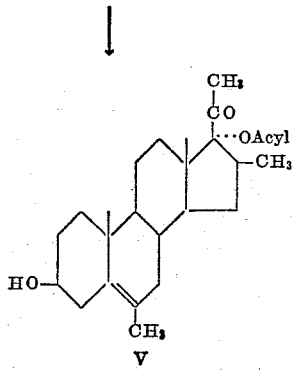

V

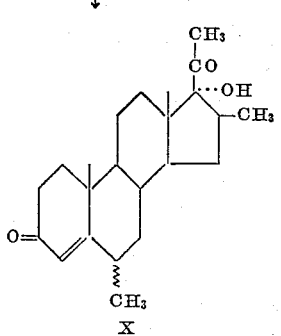

X

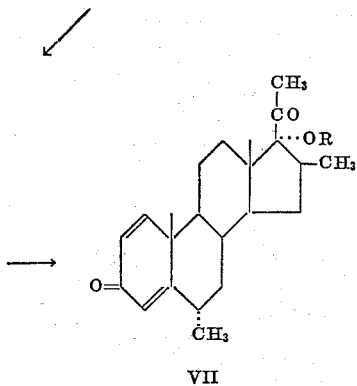

VII

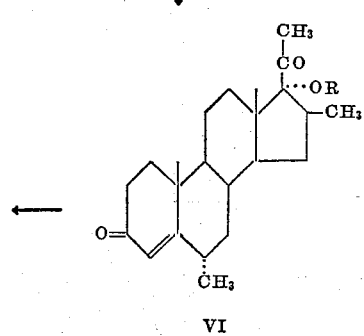

VI

In the above equation R represents the same groups as heretofore.

The novel method of my invention starts from 6,16-dimethyl - $\Delta^{5,16}$-pregnadien-3$\beta$-ol-20-one (I), claimed by Djerassi and Ringold in their U.S. patent application Serial No. 773,818, filed on November 14, 1958. By catalytic hydrogenation in the presence of nickel, I selectively saturated the double bond at C–16,17 and obtained 6,16$\beta$-dimethyl-$\Delta^5$-pregnen-3$\beta$-ol-20-one (II), the key compound in my invention, which method involves the following operations: the introduction of the 17$\alpha$-hydroxy or 17$\alpha$-acyloxy group, the oxidation of the 3$\beta$-hydroxyl group to a keto group, the rearrangement of the double bond to $\Delta^{4,5}$, the inversion of the steric configuration at C–6 of the intermediate 6$\beta$-methyl compounds, as well as, optionally, dehydrogenation at C–1,2.

For introducing the 17$\alpha$-hydroxy group I first protected the double bond of 6,16$\beta$-dimethyl-$\Delta^5$-pregnen-3$\beta$-ol-20-one (II), conveniently by the addition of two chlorine atoms; by the method of Kritchevsky, Garmaise and Gallagher (J. Am. Chem. Soc., 74, 483, 1952) I then formed a $\Delta^{17(20)}$-enol acetate, epoxidized the double bond with a peracid and subjected the 17,20-epoxide to an alkaline treatment. Thus I obtained 6,16$\beta$-dimethyl-5,6-dichloro-pregnan-3$\beta$,17$\alpha$-diol-20-one. By the elimination of the two chlorine atoms by treatment with zinc I produced 6,16$\beta$-dimethyl-$\Delta^5$-pregnen-3$\beta$,17$\alpha$-diol-20-one, whose 17-hydroxy group was converted into a 17-acetoxy group by diacetylation followed by selective hydrolysis of the 3-acetoxy group. (Alternatively, there can be prepared other esters with carboxylic residues of up to 21 carbon atoms, instead of the acetate.) By oxidation with aluminum isopropylate in the presence of a hydrogen acceptor (Oppenauer method), followed by an acid treatment, the $\Delta^5$-3-hydroxy-6-methyl grouping was converted into the desired $\Delta^4$-3-keto-6$\alpha$-methyl grouping and, upon dehydrogenation with selenium dioxide there was obtained as final product 6$\alpha$,16$\beta$-dimethyl-$\Delta^{1,4}$-pregnadien-17$\alpha$-ol-3,20-dione under the form of its acetate.

To obtain the free 17$\alpha$-hydroxy compound the sequence of reactions was modified suppressing the esterification: 6,16$\beta$ - dimethyl-5,6-dichloro-pregnan-3$\beta$,17$\alpha$-diol-20-one is first oxidized (in this case preferably with chromic acid) to form the 3-keto group and then there is applied the zinc dehalogenation, followed by the rearrangement of the double bond and the inversion at C–6. Thus I obtained 6$\alpha$,16$\beta$-dimethyl-$\Delta^4$-pregnen-17$\alpha$-ol-3,20-dione and, by dehydrogenation of the same, the aforementioned 6$\alpha$,16$\beta$-dimethyl-$\Delta^{1,4}$-pregnadien-17$\alpha$-ol-3,20-dione.

Alternatively, the free 17$\alpha$-hydroxy compound can be obtained from the aforementioned 6,16$\beta$-dimethyl-$\Delta^5$-pregnen-3$\beta$-ol-20-one by catalytic hydrogenation of its double bond followed by the introduction of the 17$\alpha$- hydroxy group by the aforementioned method of Kritchevsky, Germaise and Gallagher, oxidation of the 3-hydroxy group to the 3-keto group to obtain 6$\beta$,16$\beta$-dimethyl-allopregnan-17$\alpha$-ol-3,20-dione, regeneration of the double bond at C–4 by dibromination followed by conversion of the 2,4-dibromo-3-ketone into the 2-iodo-$\Delta^4$-3-ketone and deiodination of the latter, and, finally, inversion of the steric configuration at C–6 by the aforementioned acid treatment.

The examples illustrate typical conditions for carrying out these reactions. However, to those skilled in the art it is obvious that they can be modified within wide limits. For example, the selective hydrogenation of the double bond at C–16,17 of the starting compound can be effected with the use of a palladium on barium sulfate catalyst; for the oxidation of 6$\beta$,16$\beta$-dimethyl-allopregnan-3$\beta$,17$\alpha$-diol-20-one to 6$\beta$,16$\beta$-dimethyl-allopregnan-17$\alpha$-ol-3,20-dione there can also be used chromic acid under the form of its pyridine complex or in solution in aqueous acetic acid; such oxidation can also be conducted by reaction with N-bromoacetamide in aqueous acetone.

The following specific examples serve to illustrate but are not intended to limit the present invention.

*Example 1*

A mixture of 10 g. of 6,16$\beta$-dimethyl-$\Delta^{5,16}$-pregnadien-3$\beta$-ol-20-one, 160 cc. of ethanol and 3.2 g. of a nickel catalyst was hydrogenated at room temperature and slightly above atmospheric pressure, with vigorous stirring, until the equivalent of 1 mol of hydrogen had been absorbed. The mixture was heated, filtered in the hot and the solvent was evaporated. The residue was purified by chromatography on neutral alumina, thus yielding 6,16β-dimethyl-Δ⁵-pregnen-3β-ol-20-one.

A solution of 8 g. of the above compound in 100 cc. of chloroform containing a few drops of pyridine was cooled to 0° C. and slowly added to a stirred cold solution of 1.05 molar equivalents of chlorine in chloroform and the mixture was allowed to reach room temperature; the excess of chlorine was removed by passing dry air into the solution which was then washed to neutral, dried and evaporated to dryness. Crystallization of the residue from methanol-benzene afforded 6,16β-dimethyl-5,6-dichloro-pregnan-3β-ol-20-one.

A mixture of 8 g. of the above compound, 3.6 g. of p-toluenesulfonic acid and 400 cc. of acetic anhydride was subjected to slow distillation for 5 hours, collecting in this period 320 cc. of distillate. The residue was poured into ice water, extracted with ether, washed to neutral, dried and evaporated to dryness. The residue consisted of the crude 6,16β-dimethyl-5,6-dichloro-Δ¹⁷⁽²⁰⁾-pregnen-3β-20-diol diacetate which was used for the next step without further purification. The analytical sample of such compound was obtained by chromatography on neutral alumina.

8 g. of the above crude compound was mixed with 320 cc. of a benzene solution of perbenzoic acid containing 1.2 molar equivalent of the reagent and kept overnight at room temperature. It was then washed abundantly with water to neutral, dried and evaporated to dryness. The residue consisted of 6,16β-dimethyl-5,6-dichloro-17α,20-oxido-pregnan-3β,20-diol. A small fraction of this compound was purified by recrystallization from acetone-hexane.

The above crude compound was treated with 1 lt. of a 0.25 N solution of sodium hydroxide in ethanol-water (1:1) at room temperature for 1 hour, neutralized with acetic acid, concentrated to a small volume and precipitated with water; the precipitate was filtered, washed with water, dried and recrystallized from methanol-acetone. There was thus obtained 6,16β-dimethyl-5,6-dichloro-pregnan-3β,17α-diol-20-one.

A mixture of 6 g. of the above compound, 200 cc. of 80% acetic acid and 6 g. of zinc dust was slowly heated with stirring until the temperature rose to 80° C. in the course of half an hour. The cooled mixture was filtered and the solution was evaporated to dryness under reduced pressure. Crystallization of the residue from aqueous methanol furnished 6,16β-dimethyl-Δ⁵-pregnen-3β,17α-diol-20-one.

A mixture of 4 g. of the above compound, 40 cc. of acetic anhydride and 400 mg. of p-toluenesulfonic acid was kept for 24 hours at a temperature around 25° C. and then poured into ice water and heated on the steam bath for half an hour; the precipitate was filtered, thus giving 6,16β-dimethyl-Δ⁵-pregnen-3β,17α-diol-20-one diacetate. A pure sample of the compound was obtained by recrystallization from acetone-hexane.

The above crude compound was treated with 200 cc. of a 1% solution of potassium hydroxide in methanol and kept for 2 hours at 10° C. It was then neutralized with acetic acid, concentrated to a small volume and diluted with water; the precipitate was filtered, washed with water, dried and recrystallized from acetone-hexane. There was thus obtained 6,16β-dimethyl-Δ⁵-pregnen-3β,17α-diol-20-one 17-monoacetate.

A mixture of 3 g. of the above compound, 120 cc. of dry toluene and 24 cc. of cyclohexanone was distilled collecting 16 cc. of distillate in order to remove traces of moisture. It was then mixed with a solution of 6.6 g. of aluminum isopropylate in 24 cc. of anhydrous toluene and the mixture was refluxed for 3 hours, diluted with 200 cc. of aqueous sodium potassium tartrate solution and subjected to steam distillation. After cooling, the solid precipitate was filtered, washed with water and dried. There was thus obtained as main product 6α,16β-dimethyl-17α-acetoxy-progesterone, mixed with a small portion of its 6β-isomer. The crude product of the Oppenauer oxidation was dissolved in 200 cc. of glacial acetic acid and a slow stream of dry hydrogen chloride was introduced into the solution for 1 hour, maintaining the temperature at around 15° C.; the mixture was poured into ice water and the precipitate formed was collected, washed with water, dried and recrystallized from acetone-hexane. There was thus obtained 6α,16β-dimethyl-17α-hydroxy-progesterone acetate.

*Example II*

In the step of diacylation of 6,16β-dimethyl-Δ⁵-pregnen-3β,17α-diol-20-one described in Example I, there was substituted for the acetic anhydride, propionic anhydride; there was thus obtained the dipropionate of such diolone, then its 17-monopropionate and finally 6α,16β-dimethyl-17α-hydroxy-progesterone propionate.

*Example III*

To a solution of 5 g. of 6,16β-dimethyl-5,6-dichloro-pregnan-3β,17α-diol-20-one in 200 cc. of 90% acetic acid there was slowly added with stirring a solution of 900 mg. of chromium trioxide in 10 cc. of 70% acetic acid and maintaining the temperature below 20° C. The mixture was kept at room temperature for 1 hour, diluted with water and the precipitate consisting of 6,16β-dimethyl - 5,6 - dichloro - pregnan - 17α - ol - 3,20 - dione was collected by filtration and used for the next stage without further purification. A pure sample of such compound was obtained by crystallization of a fraction from acetone-hexane.

The above crude compound was treated with 5 g. of zinc dust in mixture with 160 cc. of 80% acetic acid, as described for this reaction in the previous example, to produce 6,16β-dimethyl-Δ⁵-pregnen-17α-ol-3,20-dione, mixed with its Δ⁴-isomer.

A solution of 3 g. of the latter mixture in 200 cc. of glacial acetic acid was treated with a slow stream of dry hydrogen chloride for 3 hours at a temperature around 15° C. and then poured into ice water. The precipitate formed was collected by filtration, washed with water, dried and recrystallized from acetone-hexane. There was thus obtained 6α,16β-dimethyl-17α-hydroxy-progesterone.

A solution of 2 g. of 6α,16β-dimethyl-17α-hydroxy-progesterone and 2 g. of p-toluenesulfonic acid in a mixture of 100 cc. of acetic acid and 20 cc. of acetic anhydride was allowed to react at room temperature for 3 hours, diluted with water and extracted with ether. The extract was washed with water, dilute sodium hydroxide solution, water and sodium chloride solution, dried and evaporated to dryness. Crystallization of the residue from acetone-hexane furnished 6α,16β - dimethyl - 17α-acetoxy-progesterone.

*Example IV*

A solution of 5 g. of 6,16β-dimethyl-Δ⁵-pregnen-3β-ol-20-one, described in the method of Example I, in 100 cc. of ethyl acetate was hydrogenated in the presence of 500 mg. of 10% palladium on carbon catalyst, with stirring at 40° C. until the equivalent of 1 mol of hydrogen had been absorbed; the catalyst was separated by filtration, the filtrate was evaporated to dryness and the residue crystallized from acetone hexane to produce 6β,16β-dimethyl-allopregnan-3β-ol-20-one.

The 17α-hydroxyl group was then introduced into the above compound through its enol-acetate (6β,16β-dimethyl-Δ¹⁷⁽²⁰⁾-allopregnen-3β,20-diol diacetate), formation of the epoxide 6β,16β-dimethyl-17α,20-oxido-allopregnan-3β,20-diol diacetate, in accordance with the method described in Example I, and finally by alkaline treatment of the oxido-compound. There was thus obtained 6β,16β-dimethyl-allopregnan-3β,17α-diol-20-one.

A solution of 3 g. of the above compound in 400 cc. of acetone was cooled to 10–15° C. and treated under an atmosphere of nitrogen in the course of 10 minutes with an 8 N solution of chromic acid in dilute sulfuric acid, maintaining the temperature at around 10° C., until the brown-red color of chromic acid persisted in the solution; after stirring for 5 minutes further, it was poured into ice water and the precipitate was filtered, washed with water, dried and recrystallized from acetone-hexane. There was thus obtained 6β,16β-dimethyl-allopregnan-17α-ol-3,20-dione.

A solution of 3 g. of the above compound in 70 cc. of glacial acetic acid was treated with a few drops of 4 N hydrogen bromide in acetic acid solution and then mixed dropwise with stirring with a solution of 2.1 molar equivalents of bromide in glacial acetic acid. The mixture was kept at room temperature for 2 hours, poured into ice water and the precipitate was filtered, washed with water and dried under vacuum. There was thus obtained 6β,16β-dimethyl-2,4-dibromo-allopregnan-17α-of-3,20-dione which was used for the next step without further purification.

The above dibromo-compound was mixed with 4.2 g. of sodium iodide and 125 cc. of methylethyl ketone, refluxed for 14 hours and then kept at room temperature for 12 hours. The mixture was diluted with water and the product was extracted with ether, washed with aqueous sodium thiosulfate solution and water, dried and the ether was evaporated under reduced pressure. The residue, consisting of 6β,16β-dimethyl-2-iodo-$\Delta^4$-pregnen-17α-ol-3,20-dione, was dissolved in 100 cc. of acetone and treated under an atmosphere of carbon dioxide with a solution of chromous chloride prepared from 35 g. of chromic chloride ($CrCl_3$): the mixture was kept under carbon dioxide at room temperature for 20 minutes and then diluted with water and extracted with ether. The extract was washed to neutral, dried and evaporated to dryness. There was thus obtained 6β,16β-dimethyl-$\Delta^4$-pregnen-17α-ol-3,20-dione, which was treated with dry hydrogen chloride in acetic acid solution, following the method described in Example III. By chromatography of the crude product on neutral alumina there was obtained 6α,16β-dimethyl-17α-hydroxy-progesterone.

*Example V*

A mixture of 1 g. of 6α,16β-dimethyl-17α-acetoxy-progesterone, 50 cc. of tu-butanol, 0.4 g. of recently sublimed selenium dioxide and 0.2 cc. of pyridine was refluxed under an atmosphere of nitrogen for 48 hours and then filtered through celite. The solvent was evaporated under reduced pressure and the residue was dissolved in acetone, treated with charcoal and refluxed for 1 hour. Chromatography of the product on neutral alumina yielded 6α,16β-dimethyl-17α-acetoxy-$\Delta^{1,4}$-pregnadien-1,20-dione.

*Example VI*

A mixture of 1 g. of 6α,16β-dimethyl-17α-hydroxy-progesterone, 50 cc. of anhydrous benzene, 2 g. of benzoic anhydride and 200 mg. of p-toluenesulfonic acid was allowed to react at room temperature for 48 hours, washed to neutral, dried and evaporated to dryness. Crystallization of the residue from acetone-hexane yielded 6α,16β-dimethyl-17α-hydroxy-progesterone benzoate. By the same method there was also prepared the cyclopentylpropionate.

*Example VII*

By the reaction with selenium dioxide, in accordance with the method of Example V, 6α,16β-dimethyl-17α-hydroxy-progesterone was dehydrogenated to 6α,16β-dimethyl-$\Delta^{1,4}$-pregnadien-17α-ol-3,20-dione.

A solution of 1 g. of 6α,16β-dimethyl-$\Delta^{1,4}$-pregnadien-17α-ol-3,20-dione and 1 g. of p-toluenesulfonic acid in a mixture of 50 cc. of acetic acid and 10 cc. of acetic anhydride was kept at room temperature for 3 hours, diluted with water and extracted with ether. The extract was washed with water, dilute sodium hydroxide solution, water and sodium chloride solution, dried and evaporated to dryness. Crystallization from acetone-hexane furnished 6α,16β-dimethyl-$\Delta^{1,4}$-pregnadien-17α-ol-3,20-dione acetate. By the same method using the corresponding anhydrides there was also prepared the benzoate and the cyclopentylpropionate.

I claim:

1. 6α,16β-dimethyl-$\Delta^{1,4}$-pregnadien-17α-ol-3,20-dione.
2. The hydrocarbon carboxylic acid esters of less than 12 carbon atoms of 6α,16β-dimethyl-$\Delta^{1,4}$-pregnadien-17α-ol-3,20-dione.
3. 6β,16β-dimethyl-$\Delta^4$-pregnen-17α-ol-3,20-dione.

References Cited in the file of this patent

UNITED STATES PATENTS

| | | |
|---|---|---|
| 2,786,857 | Cutler et al. | Mar. 26, 1957 |
| 2,877,237 | Djerassi et al. | Mar. 10, 1959 |
| 2,878,246 | Miramontes et al. | Mar. 17, 1959 |
| 2,878,247 | Miramontes et al. | Mar. 17, 1959 |
| 2,925,415 | Loken et al. | Feb. 16, 1960 |

OTHER REFERENCES

Spero et al.: 78 J.A.C.S. 6213 (1956).
Taub et al.: 80 J.A.C.S. 4435 (1958).